US006585899B1

(12) United States Patent
Edvardsson et al.

(10) Patent No.: US 6,585,899 B1
(45) Date of Patent: Jul. 1, 2003

(54) MOBILE WASTE TREATMENT SYSTEM

(75) Inventors: Christina Edvardsson, Oceanside, CA (US); Tomas Edvardsson, Oceanside, CA (US)

(73) Assignee: Microseptec, Inc., Laguna Hills, CA (US)

( * ) Notice: Subject to any disclaimer, the term of this patent is extended or adjusted under 35 U.S.C. 154(b) by 0 days.

(21) Appl. No.: 09/710,509

(22) Filed: Nov. 9, 2000

Related U.S. Application Data
(60) Provisional application No. 60/164,691, filed on Nov. 10, 1999.

(51) Int. Cl.[7] .................................................. C02F 1/00
(52) U.S. Cl. ....................... 210/763; 210/748; 210/750; 210/760; 210/765; 210/774; 210/805; 210/188; 210/195.1; 210/218; 210/294; 210/916
(58) Field of Search ............................... 210/748, 750, 210/760, 763, 765, 774, 805, 188, 194, 195.1, 198.1, 218, 294, 916

(56) References Cited

U.S. PATENT DOCUMENTS

| | | | |
|---|---|---|---|
| 3,856,672 A | * | 12/1974 | Boswinkle et al. |
| 3,864,258 A | * | 2/1975 | Richardson et al. |
| 4,359,789 A | * | 11/1982 | Roberts |
| 5,958,252 A | | 9/1999 | Shades |
| 6,048,452 A | * | 4/2000 | Shades et al. |
| 6,139,744 A | * | 10/2000 | Spears et al. |
| 6,328,890 B1 | | 12/2001 | Thibault |

FOREIGN PATENT DOCUMENTS

| | | |
|---|---|---|
| EP | 0 344 876 | 1/1989 |
| EP | 0 909 140 B1 | 10/2001 |
| WO | WO 01/10528 A1 | 2/2001 |

OTHER PUBLICATIONS

Patent Abstracts of Japan vol. 005, No. 065 (M–066), Apr. 30, 1981 and JP 56 016021 A (Toyo Dennetsu Kogyo K.K.), Feb. 16, 1981 abstract.

* cited by examiner

*Primary Examiner*—Betsey Morrison Hoey
(74) *Attorney, Agent, or Firm*—Knobbe, Martens, Olson & Bear

(57) ABSTRACT

Disclosed are waste processing systems capable of being used on-board a transport such as a train, bus, airplane, boat, or other similar vehicles. The liquid waste is evaporated and condensed primarily as water vapor. The resulting liquid may be safely discharged in most places without adverse environmental and health effects. If desired, the liquid can be stored and reused for non-potable applications such as toilet flushing. The solid waste is converted to inert ash or carbon and may be either stored in a filter or discharged as carbon or ash into the water, air, or onto the railroad tracks. The system may also be used in stationary or semi-stationary applications where on-site treatment of waste may be desired.

20 Claims, 3 Drawing Sheets

MOBILE WASTE TREATMENT SYSTEM

RELATED APPLICATIONS

This application claims the benefit of Provisional Application Serial No. 60/164,691, filed Nov. 10, 1999.

BACKGROUND OF THE INVENTION

The present invention relates to solid waste treatment systems. More specifically, it relates to compact treatment systems which may be used in commercial transportation vehicles such as trains, ships, buses, and airplanes.

The commercial transportation industry, specifically trains, marine vessels, and airplanes, has had limited options for handling the waste generated from on-board restroom facilities. In the past, the waste from trains was simply dumped on the tracks. On ships, the waste was dumped overboard. As environmental pressures have increased, the practice of dumping has become undesirable and often illegal. In most cases, the solution has been to store the waste on-board until it can be pumped out. This method is undesirable for a number of reasons. First, the storage of waste requires space that could otherwise be used for passengers or cargo. Second, the waste is heavy and represents an additional load the vehicle must carry which reduces the total load the vehicle can carry and negatively impacts fuel economy. Third, the infrastructure is frequently not in place to handle the pumping and treatment of the stored waste. Fourth, the time it takes to pump the waste adds to the layover time adversely effecting the service time. Fifth, the stored waste is a source of odor and a potential health hazard in the event of a spill. And finally, the cost and inconvenience of storage and pumping frequently leads to illegal dumping of the waste.

SUMMARY OF THE INVENTION

The present invention relates to waste processing systems which are of a size and general configuration that permits their use on board a transport, such as a train, bus, airplane, recreational vehicle, boat, or other such moving vehicle or device. The system purifies the waste sufficiently to allow discharge, thus eliminating the storage and pump-out requirements. The liquid waste is evaporated and condensed as primarily water vapor. The resulting liquid can be safely discharged virtually anywhere. If desired, the liquid can be reused for non-potable applications. The solid waste is converted to inert ash or carbon and is either stored in a filter or discharged as carbon or ash into the water, air or onto the railroad tracks or ground.

Waste processing or treatment systems according to preferred embodiments of the present invention may also be used in stationary or semi-stationary applications where on-site treatment of waste may be desired, such as portable toilets, temporary shelters or dwellings, campsites, and the like.

In accordance with one embodiment of the present invention there is provided a system for treating waste having liquids and solids therein. The system comprises a thermal processor adapted to thermally decompose the waste into vapor and carbonaceous material and a vapor treatment system in fluid communication with the thermal processor, wherein the vapor is separated into aqueous and gaseous components and treated for disposal or reuse. In preferred embodiments, the waste treatment system further comprises a toilet waste storage tank, and the vapor treatment system comprises one or more of the following: a condenser, a disinfection module, a catalytic converter, and a flush water storage tank.

In accordance with another embodiment of the present invention, there is provided a method for treating human waste containing both solids and liquids. The method comprises thermally decomposing the waste to form carbonaceous material and vapor, treating the vapor with a catalytic converter, separating the vapor to aqueous and gaseous components, exhausting the gaseous components, and treating the aqueous components. In accordance with preferred embodiments, the method further comprises disinfecting the aqueous components and recycling the disinfected aqueous components for re-use within the system, or disinfecting the aqueous components and releasing the treated aqueous components outside the system. In preferred embodiments, the separating comprises condensation and/or the treating comprises passing the gaseous components through a catalytic converter to oxidize ammonium or nitrogen-containing compounds in the vapor.

DETAILED DESCRIPTION OF THE PREFERRED EMBODIMENT

The following description and figures illustrate preferred embodiments of the present invention. Those of skill in the art will recognize that there are numerous variations and modifications of this invention that are encompassed by its scope. Accordingly, the description of preferred embodiments which follows and which are illustrated in FIGS. 1, 2, and 3 should not be deemed to limit the scope of the present invention as defined by the claims.

Although the present invention is described in terms of being a mobile waste treatment system, the inventors contemplate that the inventive system, including the preferred embodiments disclosed herein, can be used for stationary or semi-stationary (portable) applications. Such applications include location of systems in places which have no infrastructure or those which require water recycling, and may include locations such as golf courses, campsites and buildings and housing in remote areas.

Figure 1:
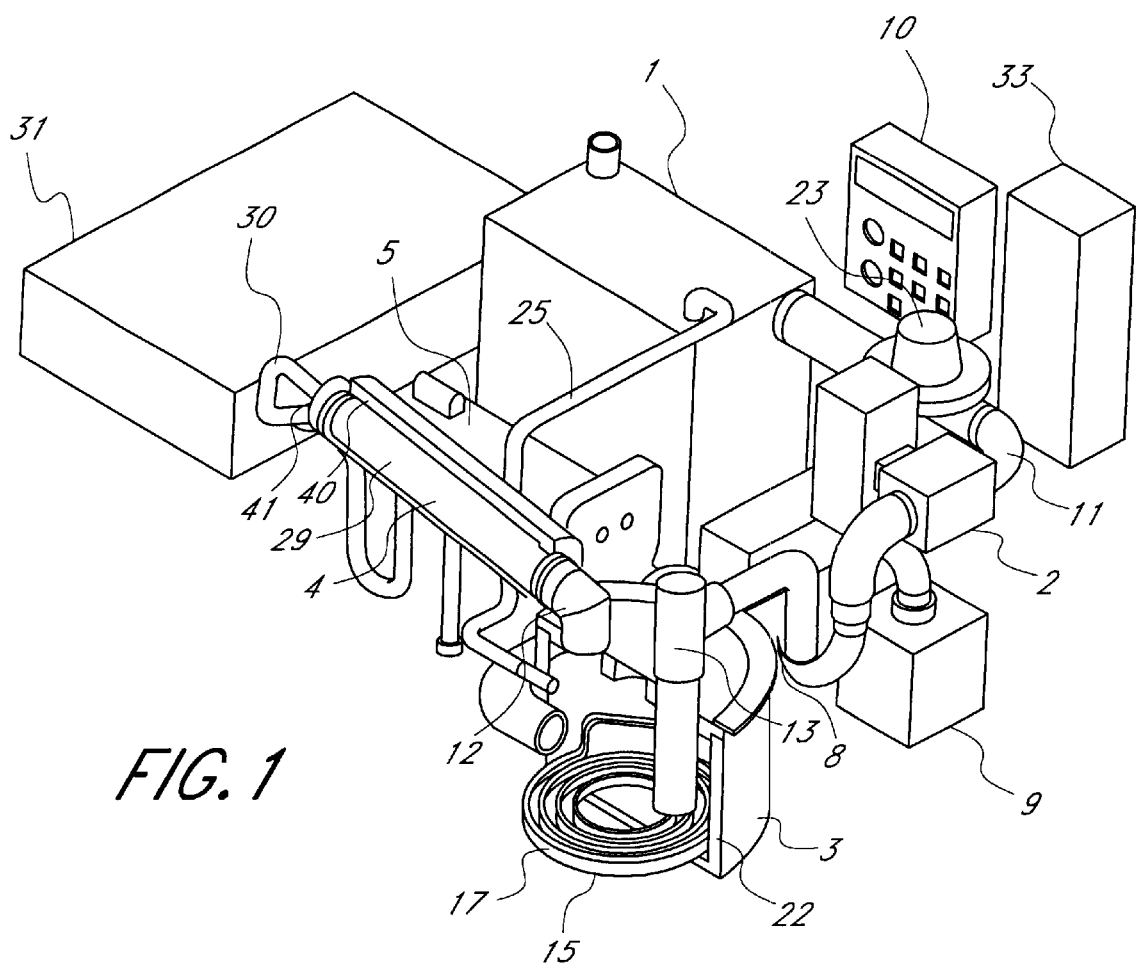
FIG. 1 is a schematic view of a horizontal waste treatment system where the waste is pumped from the intermediate tank to the thermal processor and in which the treated water is released to the environment.
Figure 2:
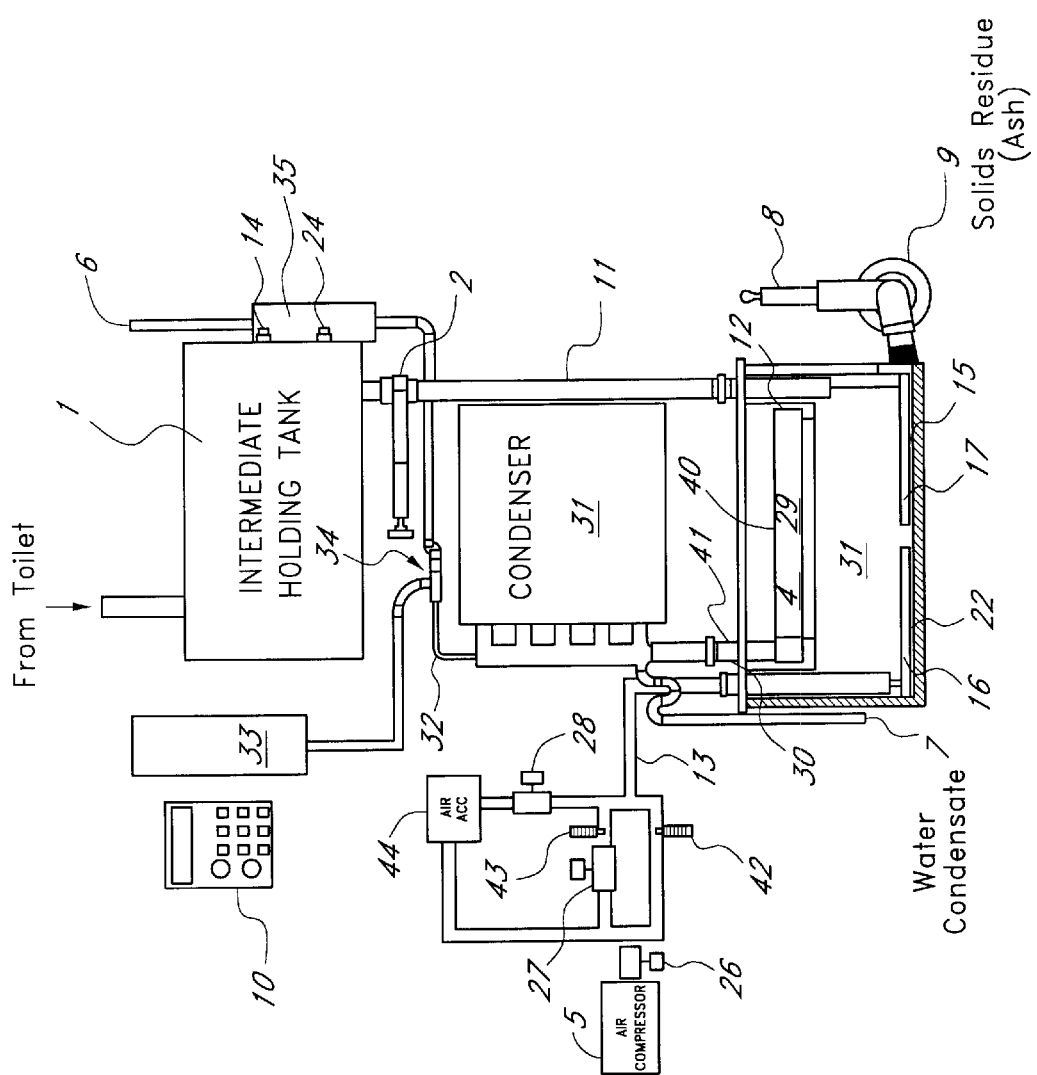
FIG. 2 is a schematic view of a vertical waste treatment system where the waste flows by gravity from the intermediate tank to the thermal processor and in which the treated water is released to the environment.
Figure 3:
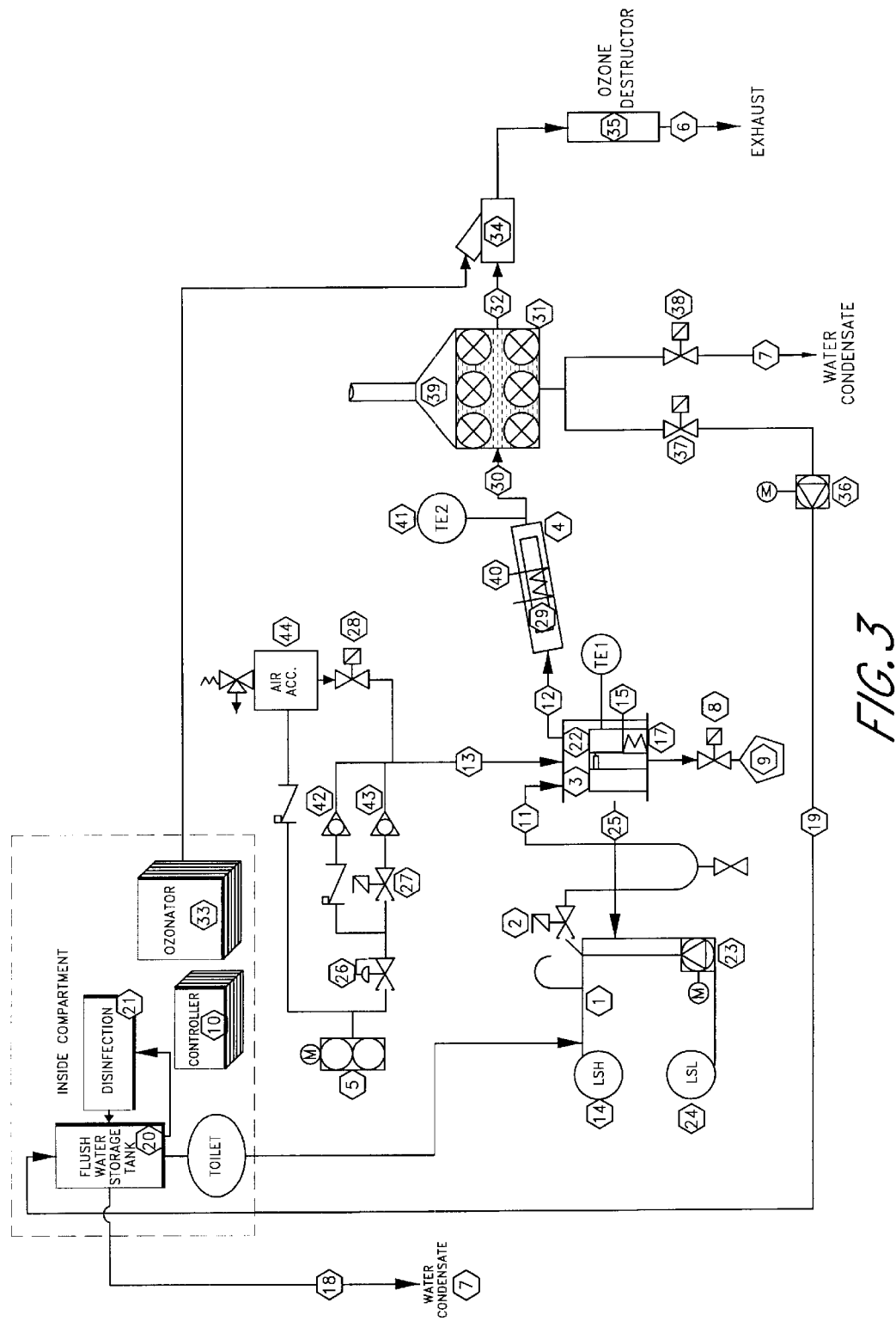
FIG. 3 is a schematic view of a waste treatment system in which the water is reused.

Referring now to FIGS. 1, 2 and 3. The combined liquid/solid waste from one or more toilets is stored in the toilet waste intermediate holding tank 1. The waste is then transferred from the waste storage tank 1 into the thermal processor 3 through conduit 11 by gravity. A valve 2 is placed in the conduit 11 to control the flow of waste into the thermal processor 3. The total filling volume is controlled by the time the valve 2 is open and by the two level switches 14 and 24 in the intermediate holding tank 1. The transfer of waste from the storage tank 1 is stopped by closing the valve 2. Opening and closing of valve 2 is preferably controlled by the computer control system 10. The computer control system 10 may be any standard unit as is known in the art for controlling and coordinating the operation of several individual components.

In an alternate embodiment, the waste may be transferred to the thermal processor via a pump 23 capable of pumping combined solids and liquids through conduit 11. In this embodiment, the pump 23 and valve 2 are turned on and off based on time, and level switch 24 in the intermediate holding tank 1, and is preferably done via the computer control system 10. The pump 23 is also interlocked with the temperature reading measured by a thermocouple 17 in the thermal processor 3. Excessive level in the thermal processor 3, in case of pump 23 malfunction, is prevented by an overflow line 25 back to the intermediate holding tank 1.

The thermal processor 3 operates in two distinct modes: evaporation and solids decomposition. A typical daily operating cycle for the system consists of five evaporation cycles followed by a thermal decomposition cycle, however the number and frequency of cycles during a day may be increased or decreased in response to the quantity and/or qualities of waste which enters the system. For example, if the waste entering the system during a period of time has a lower content of solids than what is anticipated, more evaporation cycles would be performed per decomposition cycle.

The evaporation mode is used to dehydrate the waste solution, and involves the application of heat and pressurized air. The waste solution is heated by one or more heating elements, preferably high-surface-area electrical resistance fire bar(s) 15 and 16 contained within the thermal processor 3. In a preferred embodiment, the inside of the thermal processor 3 is lined with a rigid ceramic fiber insulation 22 which aids in energy conservation and personal protection. During heating, the air compressor 5 is employed to assist evacuation of the vapor through conduit 12 and maintain the lowest water vapor pressure possible, improving the efficiency of the evaporation process. The air flow is controlled by the pressure regulator 26 and the flow control valve 42, and by keeping the valve 27 closed. The air compressor 5 and the valves 26 and 27 are controlled by the computer control system 10. The flow control valves 42 and 43 are preferably set manually during start-up of the system. The evaporation cycle continues until the temperature in the heating elements 15, 16 as measured by the integral thermocouple 17 reaches about 200 to 300° F., preferably about 250° F. When this temperature is reached, the power to the elements is turned off. The blower 5 continues to run to evacuate the hot gas and cool the thermal processor 3. When the temperature reaches about 150 to 220° F., preferably about 200° F., the fill cycle is repeated.

The thermal decomposition mode of the thermal processor preferably uses a cycle comprised of multiple progressive temperature plateaus in combination with excess air addition. It has been found by the inventors that energy consumption and emissions are minimized by operating in this manner. Specifically, the cycle starts with opening the valve 27 to increase the air flow and heating the waste a first temperature and held at that temperature for a predetermined period of time. At the completion of the first specified time period, the temperature is increased to a second higher temperature and held for a period of time. This process is repeated until the final time and temperature cycle is complete, which results in the waste being converted to ash and/or solid carbon. In one preferred embodiment, the cycle comprises to four steps: (1) a first step in which the waste is heated to a temperature of about 150 to 250° F. for a period of 60 to 300 minutes; and (2) a second step in which the waste is heated to a temperature of about 300 to 450° F. for a period of 15 to 120 minutes; and (3) a third step in which the waste is heated to a temperature of about 450 to 650° F. for a period of 15 to 180 minutes; and (4) a fourth step in which the waste is heated to a temperature of about 650 to 900° F. for a period of 15 to 120 minutes. At the conclusion of the thermal decomposition process, the solid waste has been converted to inert ash and/or activated carbon, depending on the time and temperature parameters chosen.

At the conclusion of the thermal decomposition cycle, the residual ash is allowed to cool to about 200° F. The valve 27 is open during cool-down to provide maximum amount of air. When 200° F. is reached, the valve 27 is closed and the ash dump valve 8 is opened. The air accumulation tank 44 has continuously been charged with pressurized air from the air compressor 5 during the evaporation and decomposition cycles. The ash discharge will start by opening valve 28. The high volume airflow creates a turbulent condition in the thermal processor which entrains the ash into the air stream. The air stream exits the thermal processor via the ash dump valve 8 and is collected in the solids residue storage device 9. The solids residue storage device incorporates a heat resistant, high flow filtration media with the requisite particulate retention and high flow-low pressure drop characteristics. In an alternate embodiment, the removal may be done by a liquid flush. Preferably, the times, temperatures, blower operation, and valve openings are controlled and coordinated by the computer control system 10.

During the evaporation and decomposition cycles, the water vapor exits the thermal processor through conduit 12 and then passes through the catalytic converter 4 which is heated to between 300 and 600° F. preferably using a ceramic fiber heater 40. The temperature is measured by a thermocouple 41 and controlled by the computer 10. The catalytic converter contains a catalyst that will catalyze the oxidation of ammonia into nitrogen gas. The catalyst may consist of manganese dioxide coated on a honeycomb support structure 29 or coated on alumina beads. Other oxidation catalysts may be used including, without limitation, those having compounds or materials comprising cobalt, copper-zinc, or iron-zinc. The use of an ammonia oxidation catalyst is preferred because the evaporation temperature of ammonia is lower than water, such that high concentrations of ammonia will be present in the water vapor exiting the thermal processor 3 if it is not eliminated. The clean water vapor exits the catalytic converter 4 through conduit 30 into an air-cooled condenser 31, which condenses the water vapor into water condensate 7. The condenser 31 may be cooled with alternative cooling media such as cooling water, or other known refrigerants. The excess heat may be recovered or vented to the atmosphere. There may also be a small stream of non-condensable gases and water vapor exiting the condenser 31 through conduit 32. Such gas may contain trace quantities of odorous gases, such as nitrogenous and/or sulfur-containing compounds, which, according to preferred embodiments, are further treated by ozone injection. Preferably the ozone is created by an ozonator 33 and injected through an injector 34 and then through an ozone destructor 35 before it is vented to the atmosphere as exhaust 6. The ozone destructor may contain an activated carbon manufactured specifically for being catalytically active in respect to the destruction of ozone. Other suitable methods, such as a scrubber, may be substituted for ozone treatment. In preferred embodiments, the condensate which has been disinfected by the elevated temperatures in the thermal processor and catalytic converter is directly discharged to the tracks or ground. In other embodiments, the condensate is further disinfected by one or more methods including, but not limited to ultraviolet radiation, ultrafiltration, and chemical disinfection such as by chlorine or ozone, and then discharged 7. In a preferred embodiment, the disinfection is performed by a disinfection module which may be integral to the condenser or separate therefrom. In one embodiment, in which the water is recycled, the disinfection module may be operated in conjunction with the flush water tank as discussed below. The condensate may optionally be filtered or deodorized prior to release. Nitrogen-containing compounds present in the vapor or condensate, such as ammonia, can optionally be chemically or electrochemically treated to form compounds such as nitrogen gas or nitrate. In preferred embodiments, the treatment, release and discharge functions are controlled by the computer control system 10.

In a system where the water is discharged following processing of the vapor and/or condensate, the condensate is released to the atmosphere. The discharge may happen directly, or the condensate may be transferred to a holding tank for discharge at a convenient or allowable location. In a system where the water is to be reused, such as is shown schematically in FIG. 3, at least a portion of the water condensate is returned to a flush water storage tank 20 via conduit 19 by opening valve 37 and closing valve 38, and using a pump 36 for re-use in flushing the toilets. The volume of water condensate to be recycled may be controlled by a level switch in the flush water storage tank 20. As an alternative, the flush water holding tank 20 will be equipped with an overflow line 18 such that all the water condensate can be recycled to the flush water holding tank 20 and any excess volumes will exit through the overflow line 18 keeping the maximum level in the tank constant.

In conjunction with flush water storage tank 20 is disinfection module 21 which disinfects the water in the tank 20 by one or more methods including, but not limited to ultraviolet radiation, ultrafiltration, and chemical disinfection such as by chlorine or ozone. In preferred embodiments, the disinfection module also does one or more of the following: deodorizes the flush water; chemically or electrochemically treats the water, as is known in the art, to convert some of the nitrogen-containing compounds to less objectionable forms; filters the water to remove any soot, ash or other particulate matter; and clarifies the water such as by adding chemicals or precipitation agents. The water in the flush water storage tank 20 may move in and out of the disinfection module via gravity, hydrostatic pressure, pump, or a combination of the preceding. In one embodiment, the disinfection module is incorporated within the tank 20. When the flush water storage tank 20 is full, the overflow exits the tank via conduit 18 as disinfected condensate and is discharged according to the application environment (e.g. onto the tracks, overboard or into landscaping.).

In a system where the heat from the condenser is to be recovered for heating the nearby cabins or similar applications, such as is shown schematically in FIG. 3, at least a portion of the air heated by the condensation of water vapor in the condenser 31 is collected 39 and can be piped to the preferred application. As an alternative, the heat can also be recovered when other cooling media than air is used, either directly or indirectly using a heat exchanger.

The storage tanks and containers in the system may be metal, plastic, glass, fiberglass, composites or any other suitable material. The various conduits may be piping or tubing made of plastic, fiberglass, metal, composites, or other suitable materials. The choice of a suitable material for a particular subunit of the system will be based upon several factors, including, but not limited to cost, performance requirements, and regulatory requirements, and may be done by one skilled in the art in view of the disclosure herein.

Although the present invention has been described in terms of certain preferred embodiments, and certain exemplary methods, it is to be understood that the scope of the invention is not to be limited thereby. FIGS. 1, 2 and 3, as well as the preceding description are intended to be only exemplary, and may contain a larger or smaller number of process steps and equipment than other methods which fall within the scope of the invention as claimed. Instead, Applicant intends that the scope of the invention be limited solely by reference to the attached claims, and that variations on the methods and materials disclosed herein which are apparent to those of skill in the art will fall within the scope of Applicant's invention.

What is claimed is:

1. A system for treating waste having liquids and solids therein, comprising:
    a thermal processor adapted to thermally decompose the waste into vapor and carbonaceous material; and
    a vapor treatment system, comprising a condenser and a disinfection module, in fluid communication with the thermal processor, wherein the vapor is separated into aqueous and gaseous components and treated for disposal or reuse.

2. A waste treatment system as in claim 1, wherein the system is sized and configured for usage aboard a transport.

3. A waste treatment system as in claim 1, wherein the vapor treatment system further comprises a catalytic converter.

4. A waste treatment system as in claim 4, wherein the catalyst is an ammonium oxidation catalyst selected from the group consisting of manganese dioxide, cobalt materials, copper-zinc materials, and iron-zinc materials.

5. A waste treatment system as in claim 1, wherein the vapor treatment system further comprises a flush water storage tank in fluid communication with the condenser and disinfection module.

6. A waste treatment system as in claim 5, wherein the disinfection module is contained within the flush water storage tank.

7. A waste treatment system as in claim 1, further comprising a toilet waste storage tank in fluid communication with the thermal processor.

8. A waste treatment system as in claim 7, wherein the toilet waste storage tank houses a portion of the vapor treatment system.

9. A waste treatment system as in claim 1, wherein the vapor is treated by one or more methods selected from the group consisting of disinfection, clarification, deodorization, scrubbing, catalytic conversion, and filtration.

10. A waste treatment system as in claim 1, wherein at least a portion of the vapor is treated with ultraviolet radiation, ultrafiltration, or chemicals, whereby it is disinfected.

11. A waste treatment system as in claim 1, wherein the carbonaceous material comprises ash or activated carbon.

12. A system for treating waste having liquids and solids therein, comprising:
    a thermal processor adapted to thermally decompose the waste into vapor and carbonaceous material; and
    a vapor treatment system in fluid communication with the thermal processor, wherein the vapor is separated into aqueous and gaseous components and treated for disposal or reuse and wherein at least a portion of the vapor is treated with ultraviolet radiation, ultrafiltration, or chemicals, whereby it is disinfected.

13. A method for treating human waste containing both solids and liquids, the method comprising:
    thermally decomposing the waste to form carbonaceous material and vapor;

treating the vapor with a catalytic converter;

separating the vapor to aqueous and gaseous components;

treating and then exhausting the gaseous components; and discharging the aqueous components.

14. A method as in claim 13, further comprising disinfecting the aqueous components and recycling the disinfected aqueous components for re-use within the system.

15. A method as in claim 14, wherein the disinfected aqueous components are recycled as flush water in toilets.

16. A method as in claim 13, further comprising disinfecting the aqueous components and releasing the treated aqueous components outside the system.

17. A method as in claim 13, further comprising treating the aqueous component, wherein the treating of the aqueous component comprises one or more methods selected from the group consisting of clarification, deodorization, and filtration.

18. A method as in claim 13, wherein the separating comprises condensation.

19. A method as in claim 13, wherein the treating comprises passing the gaseous components through a catalytic converter to oxidize ammonium or nitrogen-containing compounds in the vapor.

20. A method as in claim 13, wherein the treating of gaseous components comprises ozone injection to oxidize odorous gases and passing the gaseous components through an ozone destructor, preferably an activated carbon filter.

* * * * *